United States Patent Office 3,498,135
Patented Mar. 3, 1970

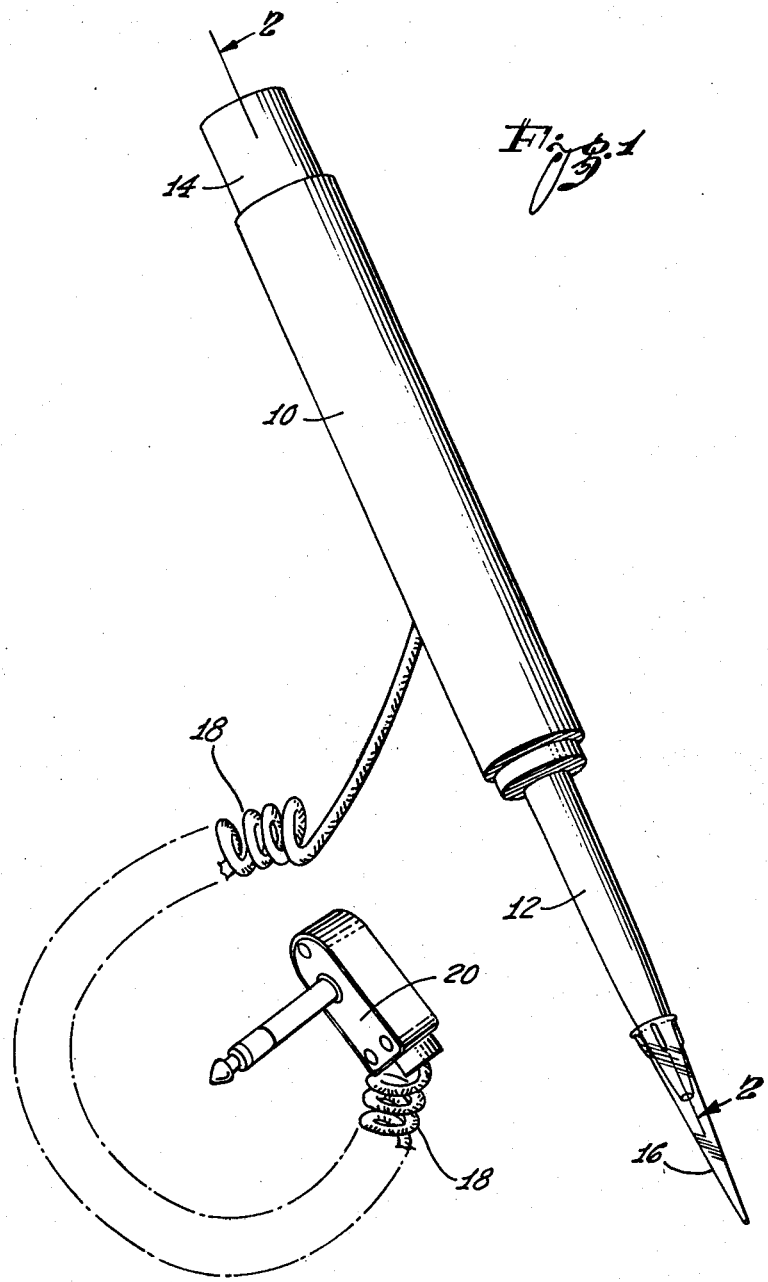

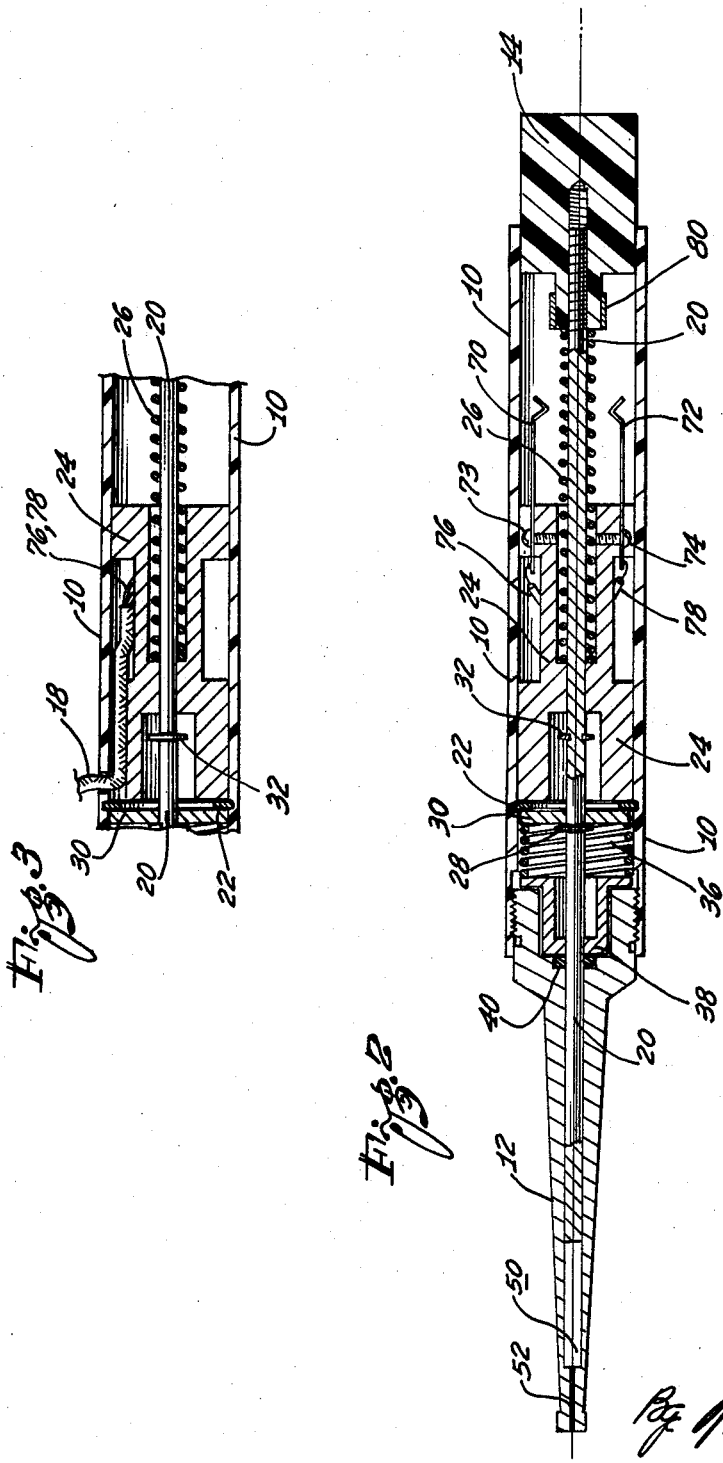

3,498,135
PIPETTE
Lamont J. Seitz, Huntington Beach, and Louis Jerg, Costa Mesa, Calif., assignors to Baxter Laboratories, Inc., Morton Grove, Ill., a corporation of Delaware
Filed Nov. 13, 1968, Ser. No. 775,252
Int. Cl. G01n 1/14
U.S. Cl. 73—425.6    10 Claims

ABSTRACT OF THE DISCLOSURE

An outer tube has a hollow elongated member attached to one end of the tube in a coaxial relationship. A rod slidable in the tube causes a replaceable tip, mounted on the hollow elongated member, to fill with fluid when the rod is moved in a first direction and discharges the fluid when the rod is moved in the opposite direction. A first spring surrounds the rod and exerts a force between a stop, mounted at an intermediate position within the tube, and the rod to bias the rod in the first direction. A second spring surrounds the rod and is interposed between the stop and the inner end of the hollow elongated member. A first limiting member is mounted on the rod to compress the second spring when the rod is moved in the opposite direction beyond a predetermined limit.

Background of the invention

The pipette, or metering syringe, of the invention as will be described herein, is useful in conjunction with a blood clot timing mechanism of the type described, for example, in copending application Ser. No. 730,832. However, it will become evident as the description proceeds that the metering syringe of the invention has general utility whenever a precisely metered amount of a liquid is to be introduced into a receptacle, or the like, for test or other purposes.

The blood clot timing system described in the aforesaid copending application, in one of its aspects, is capable of detecting clotting in a blood or plasma sample, this being achieved by the application in special equipment of a test for determining the prothrombin time. The aforesaid test involves the addition of a measured amount of the patient's blood, or plasma, to a reagent, such as thromboplastin; and the subsequent addition of a measured amount of calcium chloride, or other source of soluble calcium ions, to the solution. As described in the copending application, a timer in the equipment is started at the precise time the calcium chloride is added to the solution.

The metering syringe of the present invention is particularly suited for use in conjunction with the test described in the preceding paragraph. The syringe may be equipped with a replaceable, disposable tip so that it may be used to add different blood samples to different receptacles of reagent, and also to add the calcium chloride, all without fear of contamination. For each operation, the previous tip is discarded and replaced by a new sterile tip.

The improved metering syringe of the invention is also equipped with an improved simplified purging mechanism, which is effective to provide an additional discharge stroke as compared with the intake stroke. This additional discharge stroke enables the last drop of the liquid, which was drawn into the instrument by the intake stroke, to be discharged during the discharge stroke. In this manner, the exact quality of liquid drawn into the syringe instrument is discharged, and also the instrument is completely purged.

The improved syringe to be described herein is also equipped with electrical contacts which are closed at the end of the discharge stroke. These contacts are useful, for example, in conjunction with the equipment of the copending application to control the commencement of the timer the instant the calcium chloride is added to the solution.

The invention provides, therefore, an improved syringe type of instrument which is capable of introducing a precisely measured amount of liquid into a receptacle, and which includes a purge control so that all the liquid drawn into the instrument is discharged during the discharge stroke. The instrument to be described is extremely simple in its construction, and yet it is precise and accurate in its operation. The instrument to be described, moreover, is capable of closing an electric circuit at the termination of its discharge stroke, for reasons such as mentioned above.

The instrument of the invention finds particular utility in blood tests, such as referred to above. This is because precision is an essential requirement in such tests, as is freedom from contamination. However, it will become evident as the description proceeds, and as mentioned previously herein, that the instrument of the invention has general utility.

Brief description of the drawings

FIGURE 1 is a side view of a pipette, pipetter, or metering syringe, incorporating the concepts of the present invention;

FIGURE 2 is a side section of the instrument of FIGURE 1, taken essentially along the line 2—2 of FIGURE 1; and FIGURE 3 is a fragmentary section, similar to the section of FIGURE 2, but turned through 90° about the longitudinal axis of the assembly to reveal other operating components.

Detailed description of the illustrated embodiment

As shown in FIGURE 1, the improved syringe of the present invention comprises essentially an outer tube 10, and an elongated hollow member 12 threaded to one end of the tube. A push button 14 protrudes through the other end of the tube 10. A replaceable plastic tip 16 is frictionally placed on the extremity of the elongated hollow member 12. The plastic tip may be replaced after each use, and a quantity of such tips may be supplied with the instrument, all in a sterile condition. The instrument also incorporates an electric cord 18 and plug 20.

As will be described in more detail subsequently, the button 14 may be moved into the tube 10 until a yieldable stop is engaged, and the tip 16 may then be placed in a receptacle of an appropriate liquid. Then, when the button is released, a precisely measured amount of the liquid is drawn from the receptacle into the replaceable plastic tip. This tip contains all of the liquid so that there is no liquid contamination of member 12. The liquid may then be discharged as a pressurized stream into another receptacle from the replaceable tip 16, by again depressing the button 14.

When the yieldable stop is engaged during the discharge stroke, the button 14 may be pushed still further as a purge control, so that the last drop of liquid may be discharged through the end of the replaceable tip 16. This latter operation also closes electrical contacts within the instrument, so that the cord 18 and plug 20 provide an electrical control for associated equipment, as referred to above.

As shown in FIGURE 2, for example, the outer tube 10 encloses an elongated rod 20 which is movable along the longitudinal axis of the tube. The rod 20 may be composed, for example, of stainless steel. In a constructed embodiment, the rod 20 has a diameter of ⅛ of an inch.

The push button 14 is threaded to one end of the rod 20, as shown. A snap-ring 22 is positioned in a peripheral channel in the bore of the tube 10 at an intermediate position within the tube. The snap-ring 22 acts as a stop, and also acts as a retainer for holding the various components of the assembly within the outer tube 10.

A switch supporting bracket 24, which has a generally tubular configuration, is mounted in coaxial relationship with the rod 20, and one end of the bracket 24 bears against the snap-ring 22. The other end of the bracket 24 is counter-bored to receive a first spring 26. The spring 26, for example, is coiled around the rod 20, and one end bears against the bracket 24, and its other end bears against the inner end of the push button 14. Therefore, the spring 26 serves to bias the rod 20 to the right in FIGURE 2 with respect to the tube 10. A retainer ring 28 is mounted on the rod 20, and this retainer ring engages a stop washer 30, and biases the stop washer 30 against the ring 22, as the spring 26 biases the rod 20 to the right in FIGURE 2.

Another retainer ring 32 is mounted on the rod 20 on the opposite side of the washer 30, and this ring 32 is moved against the washer 30, as the button 14 is depressed into the tube 10 to move the rod 20 to the left in FIGURE 2. The washer 30 serves as a yieldable stop for the retainer ring 32, since the washer is biased against the ring 22, by a second spring 36. The second spring 36 is interposed between the washer 30 and a bushing-like retainer 38 which is interposed between the elongated hollow member 12 and the other end of the spring 36. An O-ring 40 serves to seal the member 12 to the rod 20.

Therefore, as mentioned above, the washer 30 serves as a yieldable stop for the retaining ring 32. That is, when the button 14 is pushed into the tube 10 to shift the rod 20 to the left in FIGURE 2, the movement may continue until the retaining ring 32 moves against the washer 30. Then, an additional force must be applied to the button 14, in order to move the rod 20 further, during which movement the retaining ring 32 moves the washer 30 against the additional bias afforded by the spring 36.

Therefore, in the operation of the instrument, the button 14 is first moved into the tube 10, until the retaining ring 32 moves against the washer 30. Then, the button 14 is released, so that the rod 20 moves to the right drawing a precisely measured amount of liquid into the replaceable disposable plastic tip 16 of FIGURE 1. Then, the liquid in the replaceable tip 16 may be subsequently discharged by again moving the rod 20 to the left in FIGURE 2, by depressing the button 14 into the tube 10. During this discharge operation, the rod 20 is moved beyond the yieldable stop afforded by the washer 30, so that the last drop of fluid may be discharged in a purging action.

A pair of resilient switch contacts 70 and 72 are supported on the bracket 24 by means, for example, of appropriate screws 73 and 74. The bracket 24 may be composed of electrical insulating material, so that the switch contacts 70 and 72 are normally insulated from one another. The contacts 70 and 72 are connected to the electric cable 18 of FIGURES 1 and 3 by respective electric leads 76 and 78.

A bridging electrically conductive member 80 composed, for example, of brass is mounted as a ring about the inner end of the button 14, the inner end having a reduced diameter, as shown. During the initial operation of the instrument, during which the rod 20 is not moved beyond the yieldable stop 30, and during which liquid is drawn into the replaceable plastic tip 16, the bridging member 80 does not engage the switch contacts 70 and 72. However, during the subsequent discharge operation, during which the rod 20 is moved fully to the left beyond the yieldable stop provided by the washer 30, the conductive member 80 moves between the switch contacts 70 and 72 to provide a bridging connection therebetween. This, therefore, provides a control corresponding to the discharge of the last bit of fluid from the instrument. Such a control, as mentioned, is appropriate in equipment, such as described in the aforesaid copending application.

It will be appreciated that the assembly shown in FIGURE 2, for example, is exceedingly simple, and the snapping 22 serves as the sole support for all the components within the tube 10. Also, the metering accuracy of the instrument depends only on the diameter of the rod 20, on the spacing between the retaining rings 28 and 32, and on the thickness of the washer 30. All these dimensions and parameters can be established to extremely close tolerances. Since the metering accuracy of the instrument is independent of other dimensions and parameters, a high degree of precision is achieved in a relatively simple way and by relatively simple and inexpensive components.

The instrument of the invention, therefore, is precise and accurate in its operation, yet it is relatively inexpensive and may be constructed in a relatively simple manner. The instrument is advantageous, since it provides a convenient and simple means for transferring precisely metered amounts of liquid. In addition, the illustrated embodiment is capable of providing appropriate electrical controls which are required in many types of instruments.

What is claimed is:

1. A syringe type of measuring instrument including: an outer tube; a rod slidable in said tube; a hollow elongated member attached to one end of said tube in coaxial relationship therewith for receiving said rod and defining a chamber which, when its volume changes, causes a replaceable tip to fill with fluid when said rod is moved in a first direction with respect to said tube and causes discharge of fluid from the replaceable tip when said rod is moved in the opposite direction; a stop member mounted in said tube at an intermediate position therein; a first spring member surrounding said rod and exerting a force between said stop member and said rod to bias said rod along the longitudinal axis of said tube and in said first direction; a second spring member surrounding said rod and interposed between said stop member and the inner end of said hollow end member; and a first limit member mounted on said rod in position to compress said second spring member when said rod is moved in said opposite direction beyond a predetermined limit.

2. The syringe type of measuring instrument defined in claim 1 in which said elongated hollow member is threadably attached to said one end of said outer tube.

3. The measuring instrument defined in claim 1 and which includes a push button attached to the end of said rod remote from said elongated hollow member, said push button protruding beyond the corresponding end of said outer tube.

4. The measuring instrument defined in claim 1 and which includes a stop washer positioned in said tube against said stop member and interposed between said stop member and one end of said second spring, and a further limit member mounted on said rod on the opposite side of said washer from said first limit member in position to engage said stop washer and limit the movement of said rod in said first direction.

5. The measuring instrument defined in claim 1 and which includes an insert member interposed in said outer tube between the inner end of said elongated hollow member and said second spring member.

6. The measuring instrument defined in claim 1 and which includes a support bracket interposed between said stop member and the end of said first spring member, a pair of switch contacts mounted on said support bracket, and a bridging electrically conductive member movable with said rod to establish electrical contact between said switch contacts when said rod is moved to a limit position in said opposite direction.

7. The measuring instrument defined in claim 1 and which includes electrical switching means mechanically coupled to said rod and actuable when said rod is moved to a predetermined axial position with respect to said outer tube.

8. A syringe type of measuring instrument including: an outer tube; a rod slidable in said tube; a knob attached to one end of said rod and protruding beyond the corresponding end of said outer tube; an elongated hollow member threadably attached to the other end of said tube in coaxial relationship therewith for receiving said rod, said elongated hollow member defining a chamber which, when its volume changes, causes a replaceable tip to fill with fluid when said rod is moved in a first direction with respect to said tube and for discharging fluids from the disposable tip when said rod is moved in the opposite direction; an annular stop member mounted in the bore of said tube at an intermediate position therein; a first spring member surrounding said rod and exerting a force between said annular stop member and the inner end of said knob to bias said rod in said first direction; a second spring member surrounding said rod and interposed between said annular stop member and said elongated hollow member; a stop washer positioned in said tube against said annular stop member and interposed between said annular stop member and the inner end of said second spring; a first retainer ring mounted on said rod between said washer and said knob and in position to engage said washer and compress said second spring member when said rod is moved in said opposite direction beyond a predetermined limit; and a second retainer ring mounted on said rod on the opposite side of said washer from said first retainer ring and in position to engage said washer and bias said washer against said annular stop member to limit the movement of said rod in said first direction.

9. The measuring instrument defined in claim 8 and which includes an insert member interposed in said outer tube between the inner end of said elongated hollow member and the end of said second spring member.

10. The measuring instrument defined in claim 8 and which includes a support bracket interposed between said annular stop member and the end of said first spring, a pair of switch contacts mounted on said support bracket and insulated from one another, and a bridging electrically conductive member integral with said knob and movable with said rod to establish electrical contact between said switch contacts when said rod is moved to a limiting position in said opposite direction.

References Cited

UNITED STATES PATENTS

| | | | |
|---|---|---|---|
| 2,530,909 | 11/1950 | Riggs | 73—425.6 |
| 2,959,964 | 11/1960 | Streitfeld | 73—425.6 |
| 3,244,009 | 4/1966 | Tietje et al. | 73—425.6 |
| 3,302,462 | 2/1967 | Pursell. | |
| 3,343,539 | 9/1967 | Moorhouse | 222—340 XR |

LOUIS R. PRINCE, Primary Examiner

HARRY C. POST III, Assistant Examiner

U.S. Cl. X.R.

23—292; 128—218

UNITED STATES PATENT OFFICE
CERTIFICATE OF CORRECTION

Patent No. 3,498,135          Dated    March 3, 1970

Inventor(s)  Lamont J. Seitz and Louis Jerg

It is certified that error appears in the above-identified patent and that said Letters Patent are hereby corrected as shown below:

In the specification, at col. 1, line 33, cancel "730,832" and insert --738,382--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents